(12) United States Patent
Wiesner et al.

(10) Patent No.: US 6,592,991 B1
(45) Date of Patent: Jul. 15, 2003

(54) BLOCK OF COPOLYMER PHASES AS TEMPLATES FOR STRUCTURED ORGANIC-INORGANIC HYBRID MATERIALS

(75) Inventors: Ulrich Bernd Wiesner, Mainz (DE); Markus Templin, Lemtörde (DE)

(73) Assignee: Max-Planck-Gesellschaft zur Förderung der Wissenschaften e.V., München (DE)

( * ) Notice: Subject to any disclaimer, the term of this patent is extended or adjusted under 35 U.S.C. 154(b) by 0 days.

(21) Appl. No.: 09/486,692

(22) PCT Filed: Sep. 3, 1998

(86) PCT No.: PCT/EP98/05585

§ 371 (c)(1),
(2), (4) Date: May 24, 2000

(87) PCT Pub. No.: WO99/12994

PCT Pub. Date: Mar. 18, 1999

(30) Foreign Application Priority Data

Sep. 5, 1997 (DE) .......................... 197 38 913

(51) Int. Cl.[7] ........................... B01J 13/00; B01J 31/14; B32B 27/32; C08G 83/00
(52) U.S. Cl. ........................ 428/404; 427/221; 427/387; 428/398; 501/12; 502/171; 502/527.24; 516/100; 516/111; 523/209; 528/403
(58) Field of Search .......................... 528/403; 516/100, 516/111; 501/12; 502/527.24, 171; 523/209; 525/79, 941; 427/221, 387; 428/404, 398

(56) References Cited

U.S. PATENT DOCUMENTS

| | | | | |
|---|---|---|---|---|
| 3,640,943 A | * | 2/1972 | Bostick et al. .............. 523/209 |
| 4,598,056 A | * | 7/1986 | Barraud et al. ..... 502/527.24 X |
| 4,732,879 A | * | 3/1988 | Kalinowski et al. .... 502/171 X |
| 5,109,080 A | * | 4/1992 | Wang et al. ............ 516/100 X |
| 5,352,512 A | * | 10/1994 | Hoffman ................. 428/398 X |
| 5,372,796 A | * | 12/1994 | Wellinghoff .............. 501/12 X |
| 5,426,136 A | * | 6/1995 | Waddell et al. ......... 523/209 X |
| 5,484,851 A | | 1/1996 | Fock ....................... 525/333.5 |
| 5,538,711 A | | 7/1996 | Emerson et al. |
| 5,593,781 A | * | 1/1997 | Nass et al. ................ 501/12 X |
| 5,698,483 A | * | 12/1997 | Ong et al. .................... 501/12 |
| 5,705,222 A | * | 1/1998 | Somasundaran et al. ..................... 427/221 X |
| 5,770,275 A | * | 6/1998 | Raman et al. .......... 427/244 X |
| 5,814,370 A | * | 9/1998 | Martino et al. ......... 428/404 X |
| 5,853,886 A | * | 12/1998 | Pinnavaia et al. ...... 523/209 X |
| 6,034,164 A | * | 3/2000 | Elspass et al. .......... 523/209 X |
| 6,410,142 B1 | * | 6/2002 | Chen et al. ............. 428/404 X |

FOREIGN PATENT DOCUMENTS

WO  WO 96/39357  12/1996

OTHER PUBLICATIONS

CAPLUS–Abstract 1998: 90678.
CAPLUS–Abstract 1997:794631.
CAPLUS–Abstract 1997:164061.
CAPLUS–Abstract 1994: 558630.
CAPLUS–Abstract 1985: 564916.
Bagshaw et al., "Templating of Mesoporous Molecular Sieves by Nonionic Polyethylene Oxide Surfactants", SCIENCE, vol. 269, Sep. 1, 1995, pp. 1242–1244.
Attard et al., "Liquid–crystalline phases as templates for the synthesis of mesoporous silica", NATURE, vol. 378, Nov. 23, 1995, pp. 366–368.
Braun et al, "Semiconducting superlattices templated by molecular assemblies", NATURE, vol. 380, Mar. 28, 1996, pp. 325–328.

* cited by examiner

Primary Examiner—Richard D. Lovering
(74) Attorney, Agent, or Firm—Rothwell, Figg, Ernst & Manbeck

(57) ABSTRACT

A process is described for preparing structured organic-inorganic hybrid materials, using an amphiphilic block copolymer as template.

40 Claims, 9 Drawing Sheets

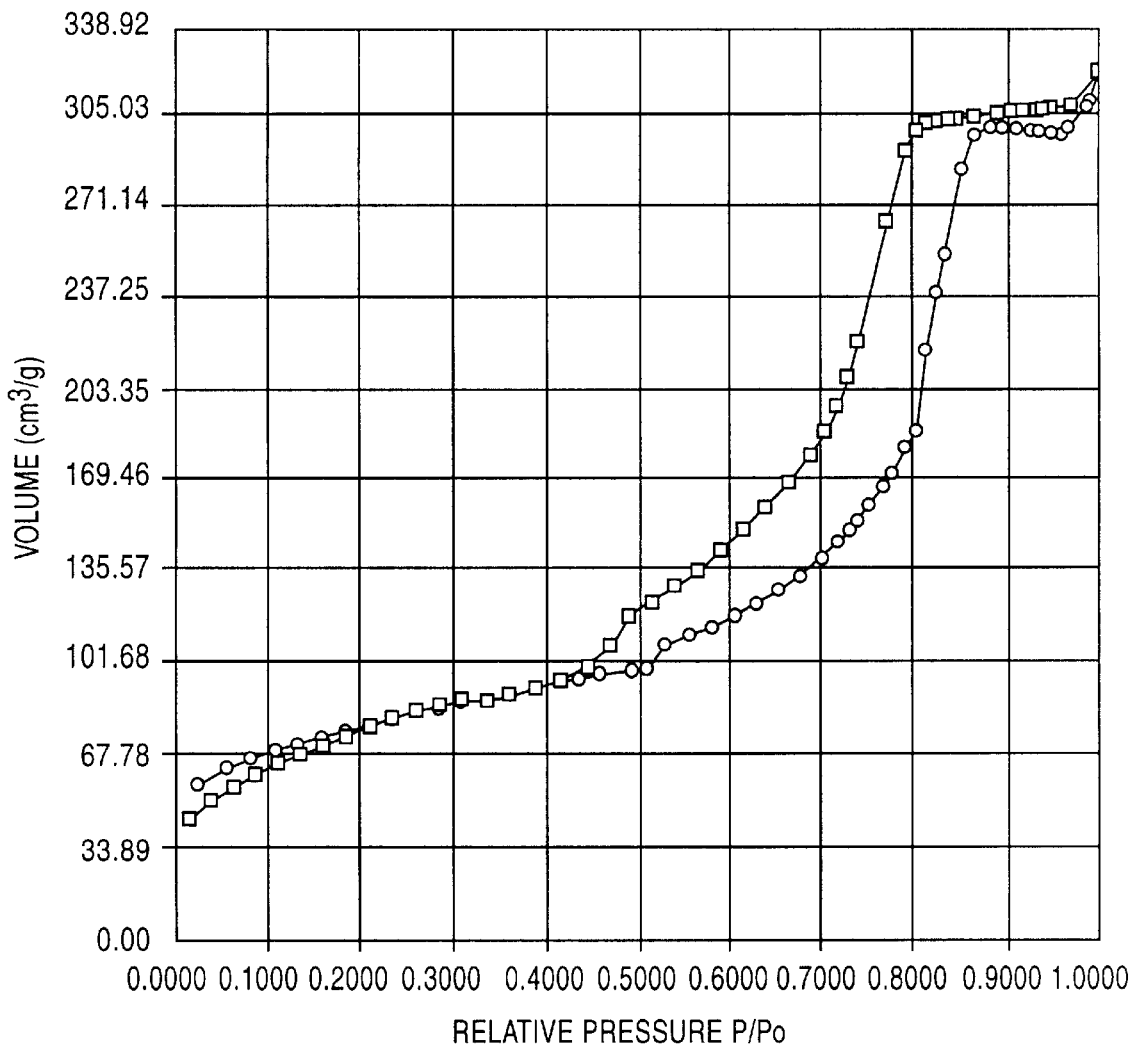

BLOCK OF COPOLYMER PHASES AS TEMPLATES FOR STRUCTURED ORGANIC-INORGANIC HYBRID MATERIALS

CROSS REFERENCE TO RELATED APPLICATION

This application is a 35 USC 371 National Phase Entry Application from PCT/EP98/05585, filed Sep. 3, 1998, and designating the U.S.

DESCRIPTION

This application is a 371 of PCT/EP 98/05585 filed Sep. 3, 1998.

The invention relates to a process for preparing structured organic-inorganic hybrid materials using amphiphilic block copolymers as templates. The process of the invention can also be used to prepare macroscopically anisotropic formed pieces, mesoporous solids and inorganic formed pieces in the nanometer range. The invention also comprises the materials prepared and their use, in particular in separation technology and in heterogeneous catalysis, and in the microelectronics industry.

Organic-inorganic hybrid materials with structures in the nanometer range are a class of materials with varied and interesting properties. Materials of this type are used in catalysis, membrane technology and separation technology, and also in developing nanoscopic structures. In particular materials in which the structures have a large length range are likely to have varied applications.

Conventional processes for preparing structured materials use self-assembling surfactants as structuring templates. The morphology of the inorganic materials is determined here by the way the surfactant molecules organize. Processes of this type have been used in particular to prepare inorganic mesoporous materials, and the surfactants used here have had low molecular weight (N. K. Raman et al., Chem. Mater. 8 (1996), 1682; U.S. Pat. Nos. 5,057,296; 5,108,725; 5,098,684 and 5,102,643). However, the aim of these processes has been to form mesoporous inorganic solids rather than an organic-inorganic hybrid material. In addition, control of structure during the conduct of the process is extremely difficult due to phase changes. Using surfactants as templates, furthermore, it is only possible to obtain mesoporous solids with relatively small pores in the range from 2 to 10 nanometers. Already at pore sizes above about 5 nanometers the inorganic solids described begin to become mechanically unstable and collapse, due to insufficient wall thicknesses. A further disadvantage is that the mesoporous solids obtained by this process can be obtained only as fine powders.

The use of lyotropic liquid-crystalline phases of low-molecular-weight surfactants has recently been described for preparing mesoporous solids (Attard et al., Nature 378 (1995), 366–367). Strict separation between aqueous (polar) and hydrophobic (nonpolar) regions in lyotropic liquid-crystal phases of this type permits the formation of an ordered structure. Polycondensation of an inorganic water-soluble monomer consolidates the inorganic material and produces a copy of the liquid-crystal structure. This makes it possible to form not only fine-grained powders but also nanostructured mesoporous monoliths. Moreover, these processes, too, serve to prepare a mesoporous material rather than an organic-inorganic hybrid material. The low-molecular-weight surfactants used moreover give only relatively low pore diameters.

The use of a lyotropic liquid-crystal phase made from amphiphilic block copolymers as a template has also been proposed for preparing mesoporous inorganic materials (C. G. Göltner et al., Adv. Mater. 9(5) (1997), 431–436). Stable mesoporous materials with pore sizes of from 7 to 15 nanometers could be obtained in this way. However, no further details concerning suitable amphiphilic block copolymers have been disclosed.

It was therefore an object of the invention to provide a process for preparing structured organic-inorganic hybrid materials while overcoming at least some of the disadvantages of the prior art.

The invention achieves this object by means of a process for preparing structured organic-inorganic hybrid materials, comprising the steps:

(a) forming a mixture comprising at least one mesophase of an amphiphilic organic block copolymer having at least one hydrophilic block and at least one hydrophobic block as template and comprising at least one precursor which can be reacted to give an inorganic solid, (b) reacting the precursor, (c) optionally removing any volatile constituents from the reaction mixture, and (d) obtaining the organic-inorganic hybrid material, wherein a hydrophobic block of the amphiphilic block copolymer has a glass transition temperature $Tg \leq 50°$ C.

According to the invention a mixture is first formed which comprises at least one mesophase of an amphiphilic block copolymer as template and comprises at least one precursor which can be reacted to give an inorganic solid. An amphiphilic block copolymer is composed of at least two blocks of different polarity, of which one is hydrophobic and the other hydrophilic, in particular water-soluble. Reacting the precursor gives an inorganic solid, either surrounding the amphiphilic block copolymers present as template of being embedded into these. During the reaction of the precursor to give the solid any volatile constituents which may have been produced are removed from the reaction mixture so that they cannot interfere with the mesophase.

Surprisingly, it has been found that use of an amphiphilic block copolymer with a glass transition temperature $Tg \leq 50°$ C. allows for controlled establishing of various structures by varying the amount of precursor added. Using a polymer of this type allows an equilibrium morphology to be obtained, and suitable selection of the amounts of the starting compounds can therefore predetermine the structures. Increasing the proportion by volume of the inorganic precursor in relation to the polymer gives the morphologies predicted from the phase diagram of diblock copolymers. The process according to the invention provides therefore a controllable route to the preparation of new and improved structured materials. Combining inorganic constituents in a hybrid material with organic block copolymers in the nanometer size range gives products with interesting mechanical properties. Since the chemistry of the block copolymers (e.g. their composition, chain length, structure, etc.) can be modified in a know manner it is possible to prepare composites with specific predetermined properties in the manner which has been known for many years for polymers.

Using block copolymers it is further possible to obtain microstructures whose order of size is within the characteristic range of lengths of the polymer chains, i.e. within a size range of from 5 to 100 nanometers. The range of lengths of the structured hybrid materials may be adjusted directly via the molecular weight of the block copolymer used.

The amphiphilic block copolymers used according to the invention as template have at least one hydrophobic and one hydrophilic block. The amphiphilic block copolymers used preferably have A-B, A-B-A or B-A-B structure, particularly preferably A-B structure, where A is a hydrophobic block and B is a hydrophilic block. Each of the individual blocks comprises $\leqq 5$ monomer units, preferably $\leqq 10$ monomer units.

Block copolymers frequently have a further structural unit linking the different blocks to one another. Other amphiphilic polymers preferably used for forming the mesophase therefore have the structure $A_n$-$C_m$-$B_n$,$A_n$-$C_m$-$B_n$-$C_m$-$A_n$ or $B_n$-$C_m$-$A_n$-$C_m$-$B_n$, where A is a hydrophohic structural unit, B is a hydrophilic structural unit and C is a low- or high-molecular-weight, hydrophobic or hydrophilic structural unit, and n, independently each time it occurs, is an integer $\geqq 5$ and m, independently each time it occurs, is an integer from 0 to 20. C is frequently a coupling molecule or a coupling group linking the individual blocks to one another. A coupling molecule of this type may be used to form a block copolymer by linking a hydrophilic polymer block to a hydrophobic polymer block. It is also possible to begin by polymerizing one of the two blocks, e.g. the hydrophobic block, and then to attach to this block a coupling molecule or a coupling group in order to modify the reactivity of the polymerized block with respect to the monomers, for example by changing the basicity, and then to continue the polymerization with another monomer, e.g. with a hydrophilic monomer.

The individual blocks of the block copolymers used according to the invention are preferably homopolymers, but may also have been prepared from monomer mixtures. At least one, and preferably all, of the hydrophobic blocks of the amphiphilic block copolymer here is/are selected so as to have a glass transition temperature $Tg \leqq 50°$ C.

Besides diblock copolymers (i.e. block copolymers which essentially comprise two different monomers) it is also possible to use triblock copolymers (i.e. block copolymers essentially comprising three different monomers) or higher block copolymers (i.e. those having more than three different monomers). The use of triblock copolymers as described, for example, by R. Stadler, Macromolecules 28 (1995), 3080–3097 and U. Breiner et al., Makromol. Chem. Phys. 198 (1997), 1051–1083, allows other interesting structures to be obtained which can be derived from the phase diagrams of these triblock copolymers or higher block copolymers.

The hydrophobic fraction of the block copolymer is preferably selected to have a glass transition temperature Tg below the reaction temperature. In this way the equilibrium morphology develops during the reaction of the precursor in the mesophase or, respectively, anisotropic liquid phase of the amphiphilic block copolymer, so that the desired structure based on the equilibrium phase diagram for the block copolymer can be obtained. A hydrophobic block in the amphilphilic block copolymer preferably has a glass transition temperature $\leqq$ room temperature, i.e. 25° C., particularly preferably $\leqq 0°$ C. and most preferably $\leqq -25°$ C.

Examples of preferred hydrophobic polymers which may be used as a hydrophobic block in the amphiphilic block copolymer are polyisoprene, polybutadiene, polydimethylsiloxane, methylphenylsiloxane, polyacrylates of $C_1$–$C_4$ alcohols, polymethacrylates of $C_3$–$C_4$ alcohols, and hydrogenated polyisoprene or/and polybutadiene as long as these hydrogenated polymers are not in crystalline form. Particular preference is given to using polyisoprene used as hydrophobic block. Polyisoprene has a glass transition temperature Tg of about 213 K. A high cis-1,4 content in the hydrophobic block, e.g. as present in a polyisoprene block, gives the styrene high mobility at room temperature and allows rapid formation of structures having a long-range order. However, it is also possible to use a interpolymer made from the abovementioned monomers for the hydrophobic block.

The hydrophilic block selected is a polymer miscible with the inorganic precursor in a very wide variety of mixing ratios. Examples of hydrophilic blocks which may be used are polyethylene oxide, polyvinyl alcohols, polyvinylamines, polyvinylpyridines, polyacrylic acid, polymethacrylic acid, hydrophilic polyacrylates and -amides, hydrophilic polymethacrylates and -amides, and also polystyrenesulfonic acids. The hydrophilic fraction of the amphiphilic block copolymer is preferably composed of polyethylene oxide, which is miscible in any desired ratio with most of the known inorganic precursors.

The block copolymer is preferably mixed with the inorganic precursor at $\geqq 50°$ C., particularly preferably at from 50 to 70° C. and most preferably at about 50° C. However, the mixing may also take place at lower temperatures, e.g. at room temperature. This results in swelling of the hydrophilic block, e.g. the polyethylene oxide block, by the inorganic precursors.

Preference is given to the use of amphiphilic block copolymers whose molecular weight is from 1000 to 1,000,000 dalton. Amphiphilic block copolymers of this type may be prepared by any known prior art polymerization process, e.g. by cationic, free-radical or anionic polymerization. The anionic polymerization of amphiphilic block copolymers is described, for example, by J. Allgaier et al., Macromolecules 30 (1997), 1582 and in DE-A-2,322,079. The molecular weight is selected as a function of the desired size of the nanostructures. It has been found, for example, that using a polyisoprene-polyethylene oxide block copolymer with a molecular weight of 10,000 dalton gives structures whose size is of the order of 20 nanometers, and using a polyisoprene-polyethylene oxide block copolymer with a molecular weight of 34,000 dalton gives nanostructures whose size is of the order of 40 nanometers. Preference is given to the use of a block copolymer whose polydispersity is low. The polydispersity Mw/Mn is preferably from 1.0 to 1.5, particularly preferably from 1.0 to 1.3 and most preferably from 1.0 to 1.1. Using a low-polydispersity block copolymer can give advantageously high uniformity in the size of the nanostructures.

Preference is given to the use of amphiphilic block copolymers which have a weight ratio of hydrophobic to hydrophilic blocks of from 95:5 to 5:95. By means of the weight ratio of the individual blocks can affect the structure of the mesophase of the block copolymer and the structure of the hybrid material can be affected.

The precursors used may be any desired substances which can be reacted to give an inorganic solid. The term "inorganic solid" comprises both ceramic and glassy structures, and also metals. The precursor is preferably an inorganic monomer which reacts to give a solid, e.g. a ceramic, a glass or a metal. The precursor preferably contains Si, Al and/or Ti. Examples of suitable precursors which can be converted into glasses or ceramics are metal alkoxides, such as $Si(OR)_4$, $Al(OR)_3$ and $Ti(OR)_4$ or mixtures of these, where each R is independently a straight-chain or branched, unsubstituted or substituted $C_1$–$C_8$-alkyl radical. Any substituents present are preferably inert, i.e. do not participate in the reaction of the precursors under the prevailing reaction conditions. Examples of substituents of this type are halogen, OH, epoxide, etc. Preferred precursors are silicon alkoxides and aluminum alkoxides. Other preferred precursors used are functionalized orthosilicates of Si(OR$_3$)R' type. An Si—C bond is more resistant to hydrolysis than an Si—O bond, and in this way it is therefore possible to introduce functionalized groups into the resultant inorganic structure. The radical R' may, for example, comprise a dye, a binding group, a detectable group or the like. This gives a way of providing the inorganic fraction of the material with functional groups in a predetermined and controlled manner. Particular preference is given to the use of precursors containing Si, giving organically modified silicon oxide mesostructures.

Examples of metal-forming precursors are metal compounds which in the presence of the template can form a metallic structure. This metallic structure may, for example, be formed by a chemical reaction, such as a reduction. Preferred metal compounds are metal salts and/or metal complexes, e.g. of noble metals, such as Ru, Rh, Pd, Ag, Os, Ir, Pt, Au or mixtures of these. The reaction of the precursor to give the solid may take place in various ways by reactions known from the prior art. For example, the solid may be formed by condensation of metal alkoxides in the mesophase, by oxidic or sulfidic precipitation on the template, or by reduction of metal salts on the template.

The composition and structure of the organic inorganic hybrid materials may be determined via the weight ratio of block copolymer to inorganic precursor. The weight ratio of block copolymer to precursor is preferably from 5:95 to 95:5. The structure of the organic-inorganic hybrid material depends on the ratio between the amount of the block copolymer and the amount of the inorganic precursor which becomes concentrated in the hydrophilic block of the block copolymer. The respective structure can be found from equilibrium phase diagrams for the compounds selected. Preference is giving to using an excess of the block copolymer, i.e. a ratio of from 50:50 to 95:5 between this and the precursor. This gives an organic-inorganic hybrid material with a matrix made from organic polymer, into which inorganic formed pieces of an order of size within the nanometer range have been embedded with a predetermined structure.

The solvent is particularly preferably removed from the reaction mixture prior to reacting the precursor to give the solid. The solvent used here may be water or an organic solvent. The solvent used is preferably one in which both the hydrophilic and the hydrophobic blocks of the block copolymer are soluble, for example a chlorinated hydrocarbon or a linear or cyclic ether, in particular chloroform, tetrahydrofuran or mixtures of these. It is also preferable for the inorganic precursor also to have at least some solubility in the solvent used. In this particularly preferred method of conducting the process the solvent serves merely for mixing of the individual components. After the components have been mixed together, in particular the organic block copolymer and the precursor, the solvent is removed from the reaction mixture, for example by evaporation or by vaporization if desired in vacuo. The reaction of the inorganic precursor to give the solid then takes place in a bulk phase or, respectively, in a mesophase essentially free from solvents. Surprisingly, it has been found that the structure of the hybrid material according to the invention in this case can be taken directly from the phase diagram for block copolymers. For example, if a PI-b-PEO block copolymer is used the resultant structure is predetermined directly from the phase diagram for this diblock copolymer. This is attributable to the fact that, unlike the procedure of the prior art (C. G. Göltner et al., Adv. Mater. 9 (5), (1997), 431–436) the template used is not a lyotropic liquid-crystal phase of a block copolymer but rather a bulk phase or, respectively, mesophase formed by the block copolymer itself. The structure does not therefore depend on the concentration of the block copolymer in solution or on the nature of the solvent needed to form the lyotropic liquid-crystal phase, but is determined directly by the composition of the block copolymer, i.e. by the ratio of the hydrophobic to hydrophilic blocks (including any incorporated inorganic constituents). In this way it is possible to determine the desired innovative structures of the hybrid material of the invention directly from the phase diagram for the block copolymers by selecting appropriate starting compounds. In this method of conducting the process it is preferable for the solvent to be removed from the reaction mixture to an extent of more than 50%, particularly preferably more than 90%, most preferably more than 99%, i.e. quantitatively, prior to reacting the precursor.

According to the invention it is also possible to carry out the entire process without solvent. In this case both the inorganic precursor, in particular a sol of the inorganic precursor, and the hydrophobic part of the block copolymer, in particular a block with a glass transition temperature below the mixing temperature, serve to promote thorough mixing of the components. There is then no need for removal of solvent prior to the reaction. This embodiment preferably uses a hydrophilic block with a low glass transition temperature, preferably Tg$\leq$50° C., particularly preferably Tg$\leq$25° C. and most preferably Tg$\leq$0° C. This hydrophilic block is not crystalline at the mixing temperature, and the inorganic precursor and the block copolymer can therefore be mixed directly without the intervention of a solvent.

The organic-inorganic hybrid material is preferably obtained as an anisotropic formed piece. If the organic-inorganic hybrid material is obtained in the form of particles with dimensions in the micrometer range, within the particles there are structures with local anisotropic orientation and an order of size within the nanometer range. When formed pieces are compression-molded from powders of this type, however, the result is a macroscopically isotropic solid, since the locally anisotropic grains have random orientation. However, it is frequently desirable to obtain materials with macroscopically anisotropic orientation. In this case the organic-inorganic hybrid material is obtained as an anisotropic formed piece, e.g. in the form of a monolith, as a film or as a block. This is preferably done by using the process known as solvent casting, in which the reaction mixture is cast into thin layers (thickness from about 1 to 10 mm) and then reacted. Removal of the solvent gives quasi-single crystals which have macroscopic orientation due to the interactions of the block copolymers with the substrate. By repeating this procedure a number of times it is possible to build up thicker structures.

According to the invention it is also possible to remove the template after forming the organic-inorganic hybrid material. This is preferably done by calcination and/or extraction. In this case on the one hand it is possible to obtain mesoporous materials which have high particle diameters and can be used, for example, in catalyst technology. On the other hand, if the ratio of the starting materials is selected suitably, removing the template can remove the organic matrix which surrounds the embedded inorganic formed pieces in the nanometer size range. This gives solid inorganic formed pieces with a size in the nanometer range.

The process of the invention may be carried out using the sol-gel process. Here, a first step uses water to hydrolyze an organic precursor having alkoxy groups, e.g. Si(OCH$_3$)$_4$, forming a sol comprising Si(OH)$_4$. A second step of the reaction then condenses the sol, forming a gel containing Si—O—Si bonds. This sol-gel process may be carried out in an aqueous solvent, and the first step of the reaction then takes place in an aqueous mixture comprising the block copolymer as template and comprising the organic precursor. However, for many applications it is advantageous for the organic-inorganic hybrid material to be obtained free from water. The invention therefore also includes a process for preparing structured organic-inorganic hybrid materials, comprising the steps:

(a) preparing a sol comprising a precursor which can be reacted to give an inorganic solid, (b) adding the sol from (a) to a mesophase of an amphiphilic block copolymer as template, (c) reacting the precursor and forming a gel, (d) optionally removing any volatile constituents from the reaction mixture, and (e) obtaining the organic-inorganic hybrid material.

Preferred features of this process are as described above.

The sol is preferably formed by at least partial hydrolysis of a precursor which can react to give an inorganic solid. Precise metering of the starting materials here can avoid the presence of excess water in the sol. This method of conducting the process preferably uses an organic solvent in which both the hydrophilic and the hydrophobic blocks of the block copolymer are soluble, preferably a chlorinated hydrocarbon or a linear or cyclic ether, particularly preferably chloroform, tetrahydrofuran or mixtures of these. By carrying out the process in this way the block copolymer does not have to be brought into contact with water, and water-free hybrid materials can therefore be obtained. Here again, the solvent is preferably removed from the mixture prior to reacting the precursor, giving the advantages discussed above.

Surprisingly, it has been found that adding salt to the reaction mixture can prevent any type of macroscopic phase separation from occurring between organic and inorganic phases. The reaction mixture therefore preferably also comprises a salt, thereby ensuring that the process can be carried out successfully and reproducibly. The salt here may be added to the block copolymer straightaway prior to forming the mesophase, for example straightaway during the anionic polymerization of the block copolymer. However, it is also possible for the salt to be added directly to the reaction mixture. The amount of the salt added here is from 0.01 to 5% by weight, preferably from 0.1 to 1% by weight, based on the total weight of the block copolymer used. If an organic solvent is used, THF for example, the reaction is preferably carried out in a salt-saturated solution. The salt is particularly preferably selected from the group consisting of salts known as network modifiers in glasses. Network modifiers of this type give rise to structural defects in amorphous inorganic glasses. It is likely that the hydrophilic part of the copolymer, which is swelled by the inorganic material, can become anchored into the structural defects formed by the salt in the inorganic lattice, preventing phase separation. The salts used preferably contain mono- or bivalent cations, such as alkali metal, alkaline earth metal and/or transition metal cations. The counterions used may be inorganic or organic anions, preferably inorganic ions and particularly preferably halide ions. Suitable salts are NaCl, KCl, $CaCl_2$ and the like.

The salt, used particularly preferably comprises potassium chloride.

Surprisingly, it has been found that the presence of salt is a factor which makes it substantially easier to carry out the process successfully. The present invention therefore also includes a process for preparing structured organic-inorganic hybrid materials, comprising the steps:

(a) forming a mixture comprising at least one mesophase of an amphiphilic organic block copolymer as template and comprising at least one precursor which can be reacted to give an inorganic solid, (b) reacting the precursor, (c) optionally removing any volatile constituents from the reaction mixture, and (d) obtaining the organic-inorganic hybrid material, wherein the mixture formed in step (a) also comprises a salt.

This process is preferably carried out using the starting materials and further steps given above. The use of a salt can almost completely prevent phase separation of organic and inorganic phase in the reaction mixture, making it possible to prepare reproducible organic-inorganic hybrid materials with structures in the nanometer size range.

The invention also provides an organic-inorganic hybrid material obtainable by the processes described above. A hybrid material of this type features in particular regular structures of from 5 to 100 nanometers, preferably from 20 to 100 nanometers in size. The structures are preferably nanocylinders or nanolamellae, and the hybrid material here has a periodicity of $\geq 5$ nanometers. Depending on the selection of the starting materials and of their proportions, and on the selection of the process conditions, the resultant hybrid material may on the one hand comprise an essentially organic matrix into which inorganic structures have been embedded or on the other hand be a hybrid material which comprises an essentially inorganic matrix into which the organic block copolymer used as template has been embedded. A hybrid material of this type is preferably in the form of an anisotropic solid, for example a monolith with edge length of from 0.1 mm to 10 cm, preferably from 1 mm to 1 cm, or a film.

If the hybrid material comprises an inorganic matrix with organic structures embedded therein, partial of complete removal of the template from the hybrid material of the invention gives a mesoporous solid which is likewise provided by the invention. A solid of this type preferably has a pore diameter of from 5 to 100 nanometers, particularly preferably from 20 to 100 nanometers. By suitably selecting the block copolymer, in particular by using a block copolymer with a low polydispersity, it is possible to obtain a mesoporous solid with uniform pore diameters. If the hybrid material comprises an organic matrix with inorganic structures embedded therein it can serve as starting material for producing formed pieces consisting of organic-inorganic hybrid material or of inorganic material and preferably having a diameter of from 5 to 100 nanometers. Formed pieces of this type are obtained by using organic solvents, such as tetrahydrofuran, to dissolve an organic-inorganic hybrid material with an organic matrix. After dissolving the material, residual organic constituents may be removed completely or partially by calcination. Formed pieces of this type are preferably in the form of spheres, cylinders or lamellae. By using triblock copolymers access can be gained to other new structures, such as spirals. The structures desired here are taken from the phase diagrams for triblock copolymers, and the structuring block is hydrophilic. Phase diagrams for triblock copolymers are described, for example, by R. Stadler et al., Macromolecules 28 (1995), 3080–3097 and U. Breiner et al., Makromol. Chem. Phys. 198 (1997), 1051–1083. Formed pieces with interesting new structures can be produced in this way.

After organic solvents have been used to dissolve the materials the hydrophilic polymer blocks remain in the inorganic phase. Hydrophobic polymer blocks can then protrude out of the inorganic phase, giving "hairy" solids or, respectively, formed pieces.

After removal of the organic constituents by calcination, the walls of the burnt materials are themselves, nanoporous beyond the expected pores, in particular if a polymer having hydrophilic polyethylene oxide blocks is used, which can be embedded to some extent or completely into the ceramic phase. The sintering process moreover gives relatively large cavities in the range from 50 to 200 nm, e.g. about 100 nm. The occurrence of these relatively large cavities is a very desirable phenomenon since it increases the flow rate and thus the output rate in physical separation processes.

The process of burning the organic material out of the organic-inorganic hybrid materials preferably takes place in stages which may include microscopically continuous shrinkage. In the case of mesoporous solids with an inorganic matrix the average distance between two pores decreases to about 60–70% of the initial value, while the pore diameter decreases to about 75–85% of the initial value. Measurements of pore volume using BET nitrogen adsorption showed that internal surface areas of 300 m$^2$/g, for example, could be obtained. Oxygen calcination gives a bimodal pore size distribution, e.g. pore diameters of about 10 nm and 4 nm, both pores occurring with comparable frequency (in each case at least 30% of the pore total). In contrast, air calcination can virtually prevent any production of the smaller type of pore.

The materials prepared according to the invention are preferably used in separation technology, in particular in the form of films. However, they are also highly suitable as solids for use in heterogeneous catalysis and in macroelectronics.

BRIEF DESCRIPTION OF DRAWINGS

The attached figures and the examples below give a further description of the invention.

FIGS. 2A, C and D were obtained using a Kratky compact camera (Anton Paar KG) equipped with a one-dimensional position-sensitive detector. The Ni-filtered Cu Kα radiation ($\lambda$=0.154 nm) used was from a Siemens generator (Kristalloflex 710H) operating at 35 KV and 30 mA. FIG. 2B was obtained using a Rigaku Rotaflex X-ray source and a two-dimensional area detector, and integrating over the azimuthal angle.

FIG. 7 shows a nitrogen adsorption isotherm for a sample calcined in a staged process in an atmosphere of oxygen. This sample has bimodal pore distribution with pore diameters of, respectively, 4 and 10 nm. Brunauer-Emmett-Teller (BET) evaluation of the curve gives an internal surface area of about 280 m$^2$/g.

EXAMPLES

1. Preparation of poly(isoprene-b-ethylene oxide) block copolymers (PI-b-PEO)

Two PI-b-PEO block copolymers were synthesized by anionic polymerization using the method of J. Allgaier et al. (Macromolecules 30 (1997), 1582). These PI-b-PEO block copolymers are termed PP3 and PP7. The molecular weights were 10,000 dalton for PP3 and 34,000 for PP7, and the polydispersity Mw/Mn was in each case about 1.05. The volume proportion of the PEO block was about 15% for both block copolymers.

Figure 2:
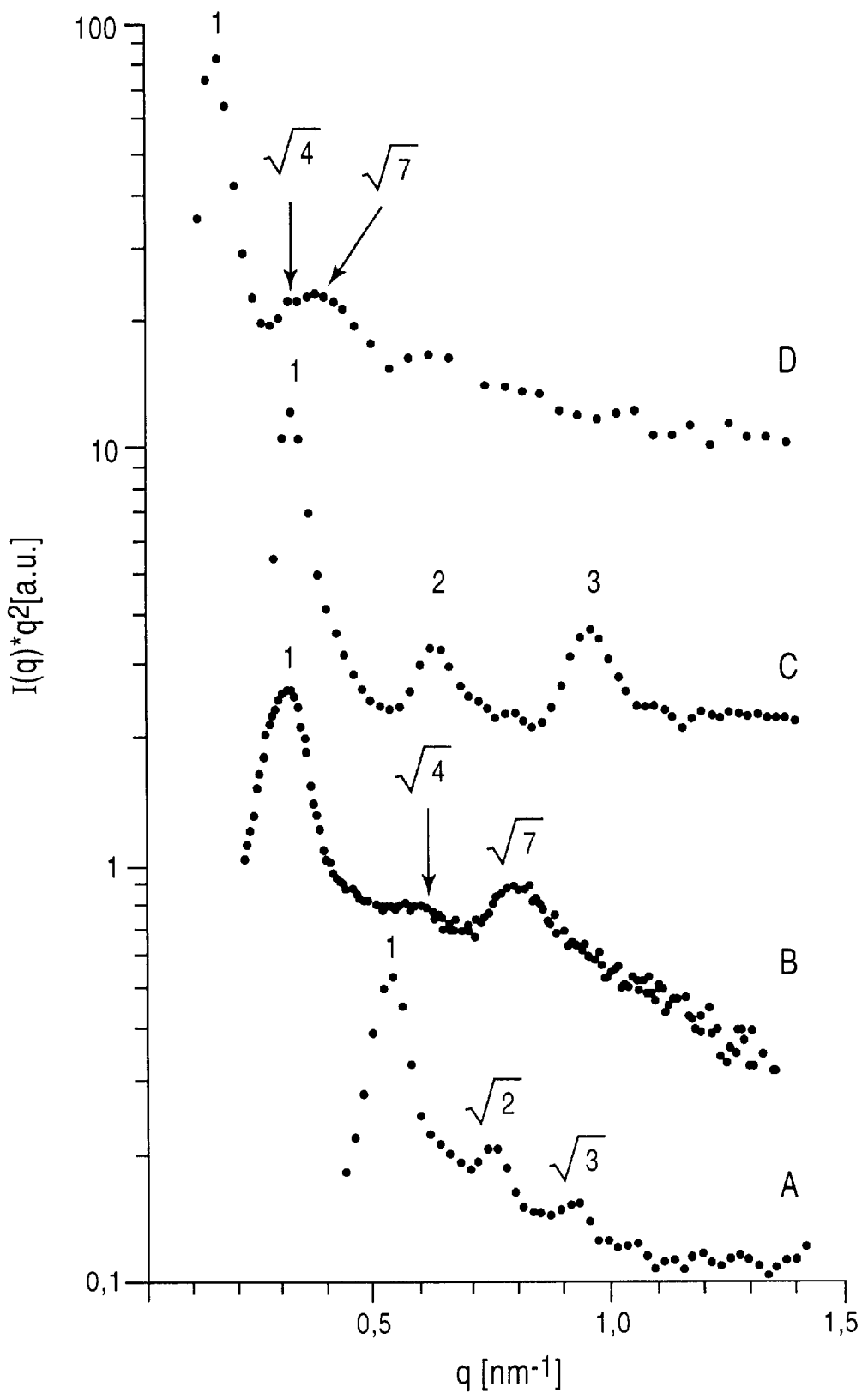
FIG. 2 shows the results obtained with small-angle X-ray scattering (SAXS) at 295 K
  (A) for a polyisoprene-polyethylene oxide block copolymer (PP3) with a molecular weight of 10,000 dalton,
  (B) the SAXS pattern for a hybrid material (PP3/4) comprising a polyisoprene-polyethylene oxide block copolymer with a molecular weight of 10,000 dalton and 0.22 g of metal oxides,
  (C) the SAXS pattern for a hybrid material (PP3/10) comprising a polyisoprene-polyethylene oxide block copolymer with a molecular weight of 10,000 dalton and 0.57 g of metal oxides, and
  (D) the SAXS pattern for a hybrid material (PP7/4) comprising a polyisoprene-polyethylene oxide block copolymer with a molecular weight of 34,000 dalton and 0.22 g of metal oxides.

The microdomain structure of the block copolymers was studied by small-angle X-ray scattering (SAXS) at 295 K. FIG. 2A shows the SAXS pattern for PP3. The main peak is centered on a value for the scattering wave vectors q corresponding to 11.9 nanometers. At least two other higher-order reflections can be seen at angular positions √2 and √3 of the first-order maximum. This pattern is characterized for spheres packed in a simple or body-centered cubic lattice, the morphology to be expected both experimentally and from theoretical studies of block copolymers of this type.

2. Preparation of novel hybrid materials using the sol-gel process 0.5 g of the PI-b-PEO block copolymer described in Example 1 is first dissolved in a 1:1 mixture of CHCl$_3$ and THF, giving a solution comprising 5% by weight of the polymer.

In parallel with this a prehydrolyzed sol was prepared by mixing (3-glycidyloxypropyl)trimethoxysilane, (CH$_3$O)$_3$Si(CH$_2$)$_3$OCH$_2$CHCH$_2$O (GLYMO from ABCR) and aluminum sec-butoxide, Al(OBu$^s$)$_3$ (from FLUKA) at 273 K with 15% of the amount of water needed for complete hydrolysis of the metal alkoxide groups. The water comprised HCl in a molar ratio of 3.6×10$^{-5}$ to 1, based on the metal alkoxides.

After stirring for 15 minutes the temperature was increased to 295 K. After 15 minutes the remaining water needed for complete hydrolysis of the alkoxide groups was added and the mixture stirred for 1 hour. To form this mixture 80 mol % of GLYMO and 20 mol % of Al(OBu$^s$)$_3$ were used. This mixture was added to the block copolymer solution and after 2 hours placed in a Petri dish at from 333 to 343 K. Once the organic solvent and evaporated (about 1 hour) the composite material was formed by heat treatment at 403 K in vacuo for 45 minutes. This method was used to prepare a series of samples by adding different amounts of the metal oxide solution to the block copolymer. In Particular samples were prepared comprising 0.22 g of metal oxides in 0.5 g of PP3 (termed PP3/4 below) and 0.57 g of metal oxides in 0.5 g of PP3 (termed PP3/10 below).

As can be seen from the SAXS patterns for PP3/4 and, respectively, PP3/10 shown in FIGS. 2B and 2C, larger structures were formed since the scattering maxima have been shifted to smaller q values. For PP3/4 the main peak is at a q value corresponding to 20.3 nanometers, and higher-order reflections are found at angular positions of √4 of this first-order maximum. A pattern of this type indicates a hexagonal array of cylinders. For PP3/10, which comprises a larger amount of the stated metal alkoxides, the main peak is at a q value corresponding to 19.6 nanometers and two other higher-order reflections can be seen at integral multiples of this q value. A sequence of this type is characteristic of a lamellar arrangement.

3. Determination of morphology

Figure 3A:
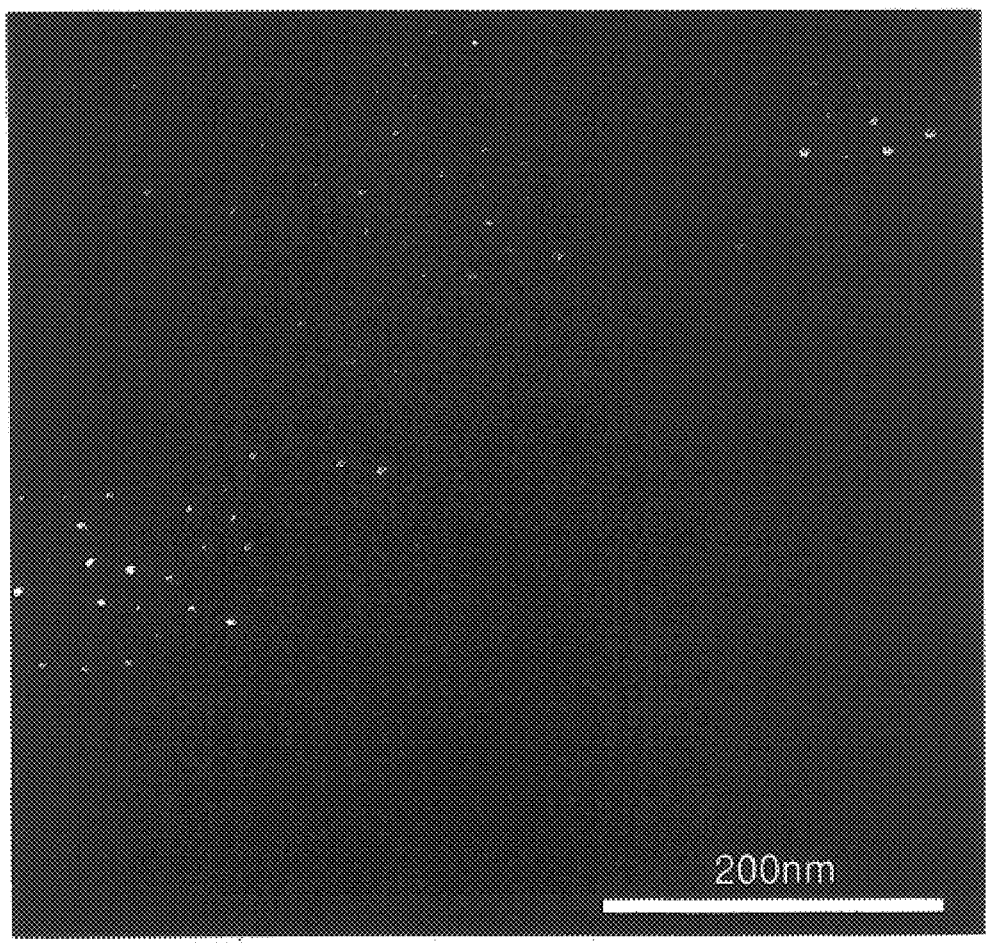
FIG. 3A is the image for PP3/4 and FIG. 3B for PP3/10.

To determine the morphology the samples were also studied by transmission electron microscopy (TEM). For the transmission electron microscopy, films of the samples PP3/4 (cf. FIG. 3A) and PP3/10 (cf. FIGS. 3B and C) were stained with OsO$_4$, embedded in Technovit® and sectioned at 218 K (Reichert cryo-ultramicrotome). Sections of 50 nanometer thickness were again stained with OsO$_4$ and studied using an LEO 912 Ω operated at 120 kV. Images A and B were recorded in energy-filtering mode (L. Reimer, "Energy filtering transmission electron microscopy", in Advances in Electronics and Electron Physics (ed: P. W. Hawkes), Academic Press Inc. London, 1991, 81, 67).

Figure 3B:
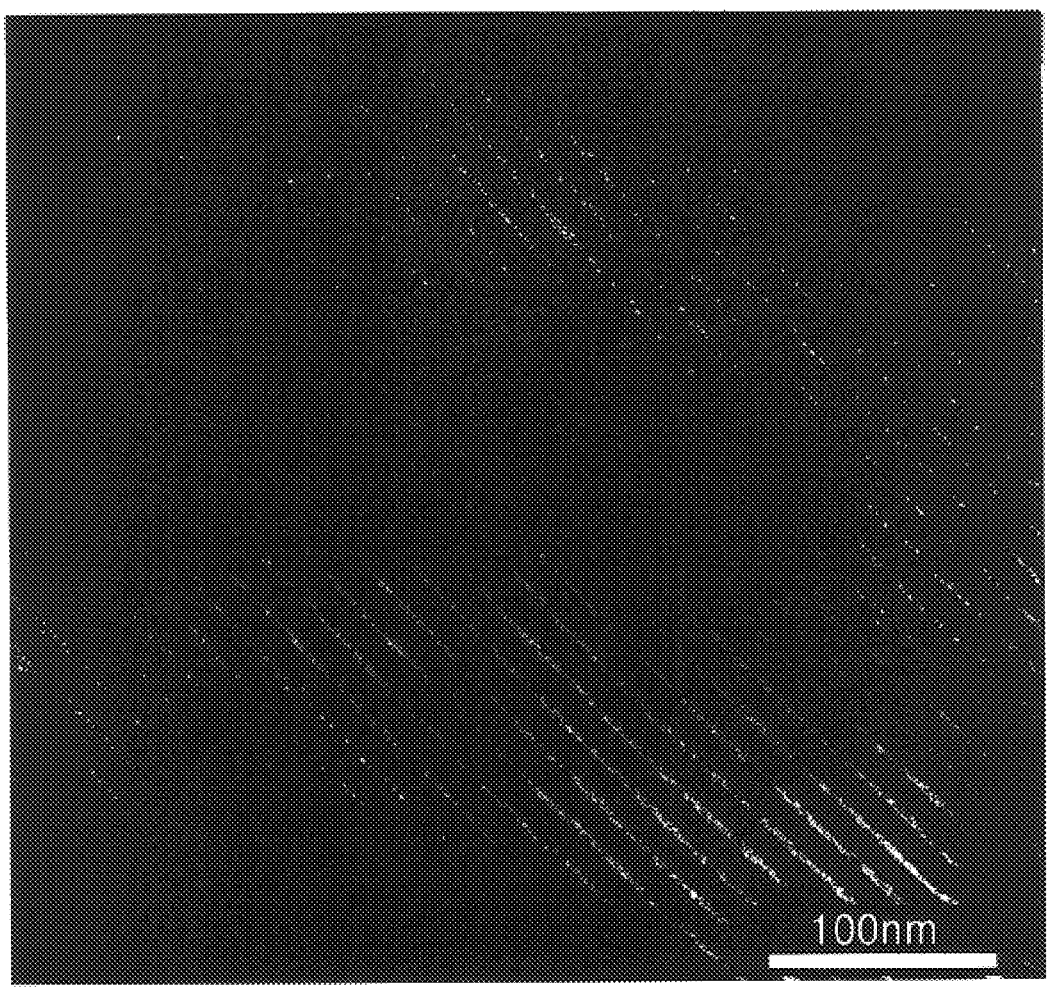
FIG. 3 shows transmission electron micrographs (TEM).
FIG. 3C shows the silicon mapping for the region shown in FIG. 3B.
Figure 3C:
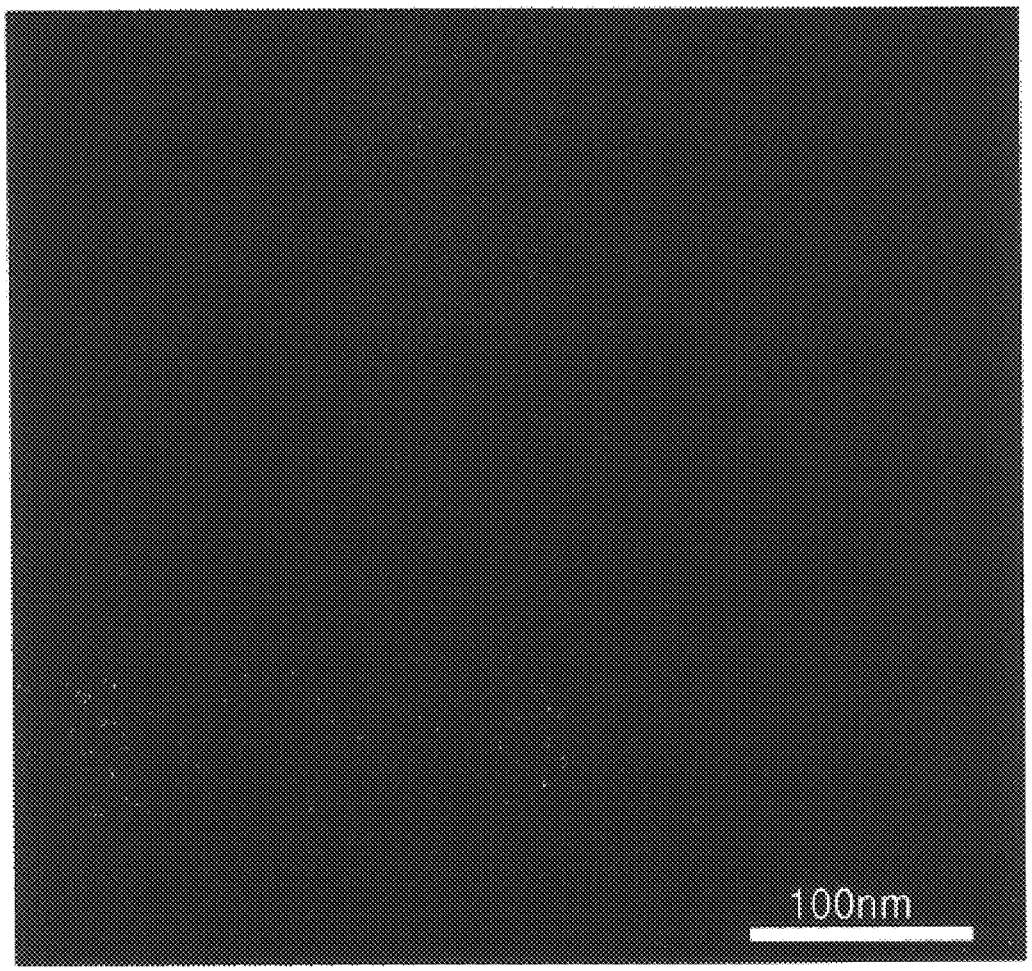

FIG. 3C shows the silicon distribution for the region shown in FIG. 3B and was recorded using element mapping and the Si-L$_{2,3}$ absorption edge (A. Ducheene et al. Coll. Polym. Sci. 272 (1994), 1329; A. Du Chesne et al., Acta Polym. 48 (1997), 142). The contrast in the micrographs shown is produced by OsO$_4$-stained isoprene, which appears black. The image of PP3/4 (FIG. 3A) shows clearly hexagonally packed cylinders, whereas the image of PP3/10 (FIG. 3B) shows lamellae, and this is in agreement with the interpretation of the SAXS patterns. From the silicon distribution shown in FIG. 3C it can be seen that the inorganic, silicon-rich phase has lamellar morphology. FIG. 3C also confirms that silicon is present in the PEO phase of the block copolymer.

The results show that the addition and concentration of metal oxides in a PI-b-PEO block polymer result in structured organic-inorganic hybrid materials with extensive ordering. By increasing the volume proportion of the metal alkoxide precursor in relation to the block copolymer different morphologies can be obtained, and these can be predetermined by simple deductions from the phase diagram. Using this method nanostructured organic-inorganic hybrid materials or, respectively, composites can be prepared in a simple and controllable manner. The size of the microstructures may readily be set by choosing an appropriate molecular weight for the polymer chains. The size of the morphologies of the composites present, shown in FIGS. 2B and C, is about 20 nanometers. For composites prepared from PP7 it is even about 40 nanometers, as shown in FIG. 2D.

The results of electron microscopy shown in FIG. 3 show that the hydrolysis products of the metal alkoxides reside primarily in the PEO phase. This is also confirmed by differential scanning calorimetry (DSC) studies observing the metal behavior of the PEO block. Whereas for pure PP3 a melting point $T_m$ is detected at 310 K, no melting is observed in DSC for the samples PP3/4 and PP3/10. It is clear that the crystallization of the PEO block is suppressed by incorporation of considerable amounts of metal oxides. However, complete suppression is only achieved if, as described above, the organic solvents are evaporated at temperatures above the melting point of PEO during the synthesis of the hybrid materials.

4. Determination of inorganic bonding

The nature of the interactions within the inorganic material was determined by solid-state NMR (nuclear magnetic resonance spectroscopy). This established that most of the silicon atoms have bonding to 2 or 3 other metal atoms (silicon or aluminum) via oxygen bridges, giving a three-dimensional network. Almost 40% of the aluminum has been incorporated into this network as a tetracoordinated species. The remaining aluminum is in aluminum oxohydroxy complexes AlO$_x$(OH)$_y$(H$_2$O)$_z$, in the form of hexacoordinated aluminum. In addition to the inorganic bonds the conversion of the epoxide group into oligoethylene oxide derivatives results in a higher network density.

5. Preparation of a macroscopically anisotropic material

Figure 4:
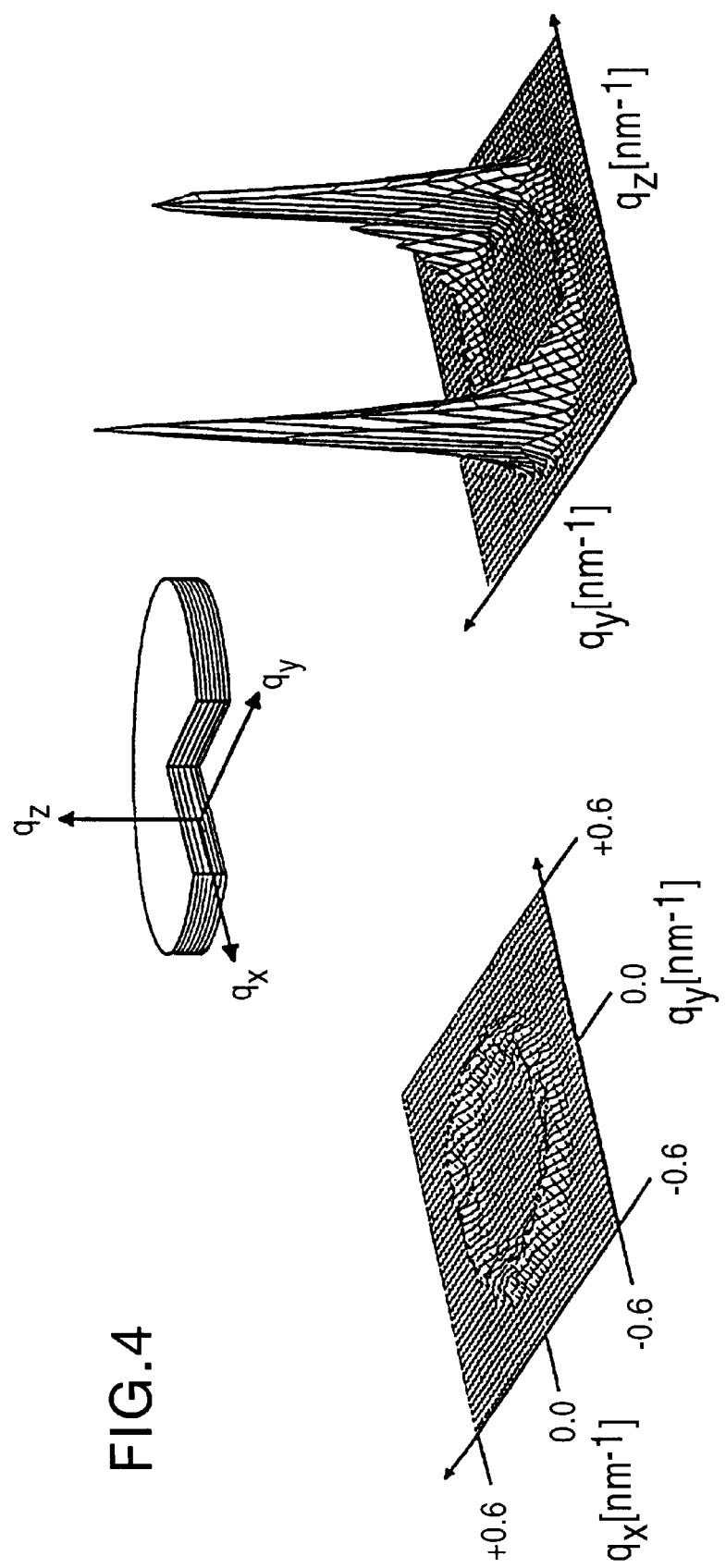
FIG. 4 shows the two-dimensional SAXS pattern for PP3/10 for X-rays in two different directions. The photographs were obtained using a Rigaku Rotaflex X-ray source at 0.154 nm (CuKα), using a three-aperture collimator to produce a beam of diameter 1 mm. The scattering patterns were recorded using a two-dimensional Siemens-X-100 area detector with a distance of 130 cm from sample to detector.

The hybrid material PP3/10 prepared in Example 2 was cast into films using the solvent-casting process (T. Hashimoto et al. Macromolecules 7 (1997), 364; D. Ehlich et al. Macromolecules 26 (1993) 189; C. Honeker et al. Chem. Mater. 8 (1996) 1702). This gave formed pieces which had a macroscopic structure, with lamellae parallel to the surface of the substrate. The structure of the films prepared using the solvent-casting process was determined by two-dimensional SAXS measurements (cf. FIG. 4). The results of these measurements confirmed that the films have lamellae oriented parallel to the film surface. Using the solvent-casting process it is therefore possible to prepare formed pieces with macroscopically anisotropic orientation from the lamellar hybrid materials of the invention.

6. Preparation of organic-inorganic hybrid materials followed by template removal A PI-b-PEO block copolymer PP5 was synthesized as described in Example 1. The molecular weight was about 14,000 Da and the polydispersity 1.06. The volume proportion of the PEO block was about 11%.

A series of films of organic-inorganic hybrid materials with thicknesses of about 1 mm was produced by mixing PP5 with various amounts of metal alkoxides using the procedure described in Example 2. Representative samples with 0.17, 0.28, 0.55, 1.49 and 3.21 g of metal oxide, in each case in 0.5 g of PP5, were termed PP5/1, PP5/2, PP5/3, PP5/4 and PP5/5. The SAXS patterns showed spherical morphology for PP5/1, cylinder morphology for PP5/2, lamellar morphology for PP5/3 and inverse cylinder morphology (PI cylinders embedded in a predominantly inorganic matrix) for PP5/4. These results were also confirmed by TEM studies. The transmission electron micrograph of sample PP5/5 shows randomly packed sinuous micelles of PI in a predominantly inorganic matrix.

The quantitative analysis of all of the samples prepared using the block copolymers PP3, PP5 and PP7 is given in Table 1. The value q* is determined from the first Bragg peak in the SAXS pattern. The dimension d gives the distance between the centers of spheres or cylinders or the lamellar separation and is calculated from the SAXS patterns. The % by volume value (PEO+inorganic) was calculated using a density of 1.4 g/cm³ (estimated from density measurements on a hybrid material made from GLYMO, Al(OBu$^s$)$_3$ and PEO homopolymer).

TABLE 1

| Sample | % by volume (PEO + inorganic) | Meso structure | q* [nm$^{-1}$] | d [nm] |
|---|---|---|---|---|
| PP5/1 | 23 | Spherical micelles | 0.28 | 22.4 |
| PP5/6 | 28 | Cylinders | 0.27 | 26.9 |
| PP5/2 | 32 |  | 0.24 | 30.2 |
| PP3/1 | 31 |  | 0.31 | 23.4 |
| PP7/1 | 30 |  | 0.15 | 48.4 |
| PP5/3 | 45 | Lamellae | 0.30 | 21.7 |
| PP3/2 | 47 |  | 0.32 | 19.6 |
| PP5/8 | 53 |  | 0.24 | 30.2 |
| PP5/4 | 65 | Inverse cylinders | 0.20 | 36.3 |
| PP5/10 | 68 |  | 0.18 | 40.3 |
| PP5/11 | 70 |  | 0.18 | 40.3 |
| PP5/12 | 74 |  | — | 43 |
| PP5/5 | 82 | Sinuous Micelles | — | — |

Figure 1:
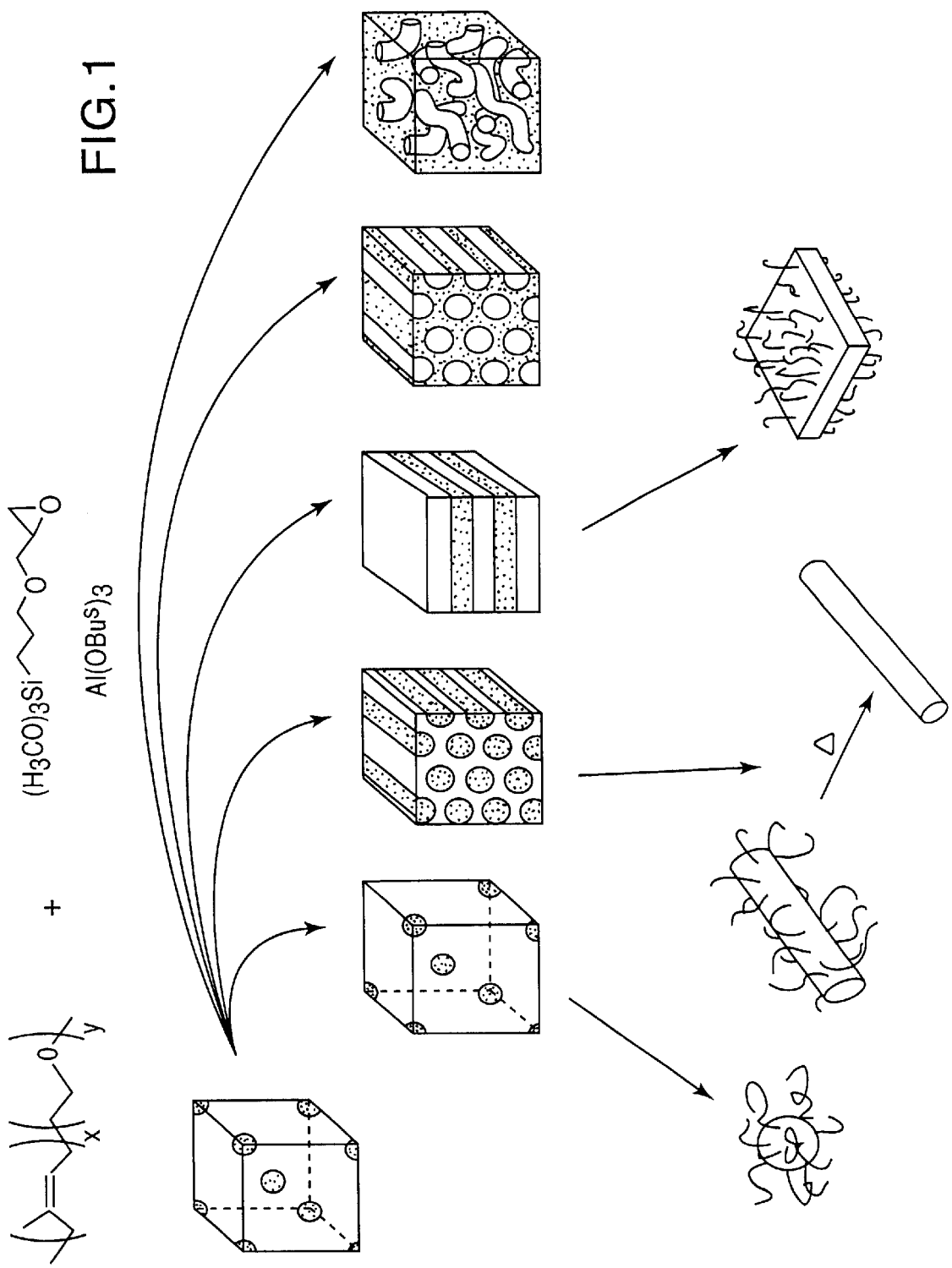
FIG. 1 is a diagram of the process of the invention for synthesizing structured organic-organic hybrid materials with a controlled shape, size and composition. The upper part shows the morphology of the starting block copolymer and examples of a number of resultant morphologies after adding different amounts of one or more metal alkoxides. The lower part of the diagram shows individual "hairy" hybrid nanoobjects obtainable by dissolving the hybrid materials in organic solvents. As shown by way of example for cylinders, organic components may be removed by heat treatment, causing shrinkage of the remaining inorganic phase.

It can be seen from the results that the condensation of the metal alkoxides results in a covalent three-dimensional network which comprises the PEO block of the PI-b-PEO block copolymer. To establish a particularly desired morphology with a dispersed inorganic phase (FIG. 1) the organic PI matrix may be swollen, finally resulting in individual isolated hybrid objects of controlled shape and size. For example, if the sample PP5/1 is dissolved, spherical bodies with a diameter of about 12 nm can be isolated. The same procedure used on the samples PP5/6 or PP5/3 results in production of isolated cylinders with a diameter of about 10 nm or, respectively, sheets.

The hydrophilic PEO blocks act here as an anchor for the metal alkoxide condensation products. This means that after the hybrid materials have been dissolved the copolymers remain embedded in the hybrid phase, and the isolated nanoobjects therefore have a thin coating of a polymer layer. This was confirmed experimentally by element-specific TEM studies which detected the presence of carbon near to the surface.

The inorganic phase of the nanoobjects of the invention comprises hydrophilic blocks of the block copolymer chains, while the hydrophobic blocks protrude. They may therefore be described as "hairy" objects, which are of very great interest for a wide variety of applications, e.g. for reinforcing polymers. An example of an advantage of the nanoobjects of the invention, when compared with phyllosilicates customarily used, is their compatibility with the organic matrix.

The results obtained show that the synthesis of the hybrid nanoobjects is highly controllable. By increasing the metal alkoxide proportion (see, for example, PP5/2 compared with PP5/6 in Table 1) the cylinder diameter is increased from 10 to 12.5 nm. Size control may moreover be further improved by using block copolymers with a different molecular weight. For example, using the block copolymer PP7 gives cylinders with a diameter of 18.5 nm.

Figure 5:
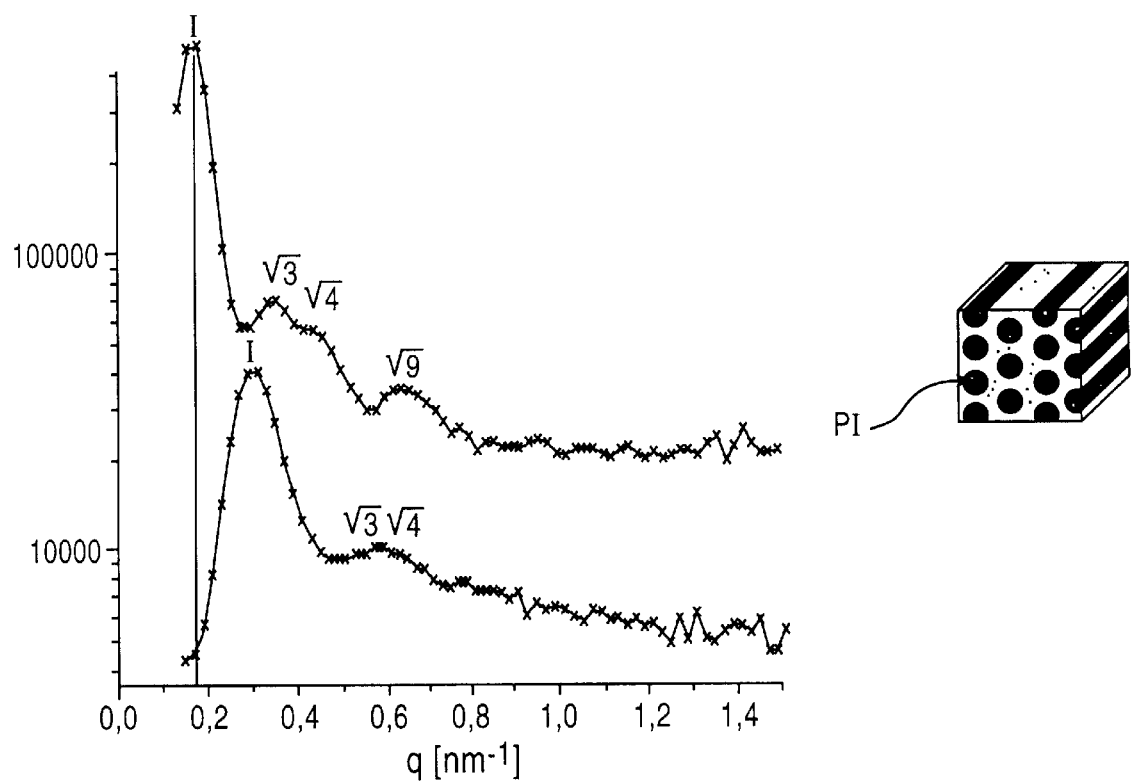
FIG. 5 shows the SAXS diffraction pattern for a sample prior to calcination (top) and thereafter. A shift of the peak maximum to higher q values, i.e. to smaller distances, is clearly apparent. Long-range order is also found to be retained after calcination.

The composition may, furthermore, be modified by heat treatment, e.g. calcination, giving ceramic materials. Loss of the organic components results in shrinking of the inorganic phase, but in the case of mesoporous materials this shrinking process takes place with retention of long-range order (FIG. 5).

Figure 6:
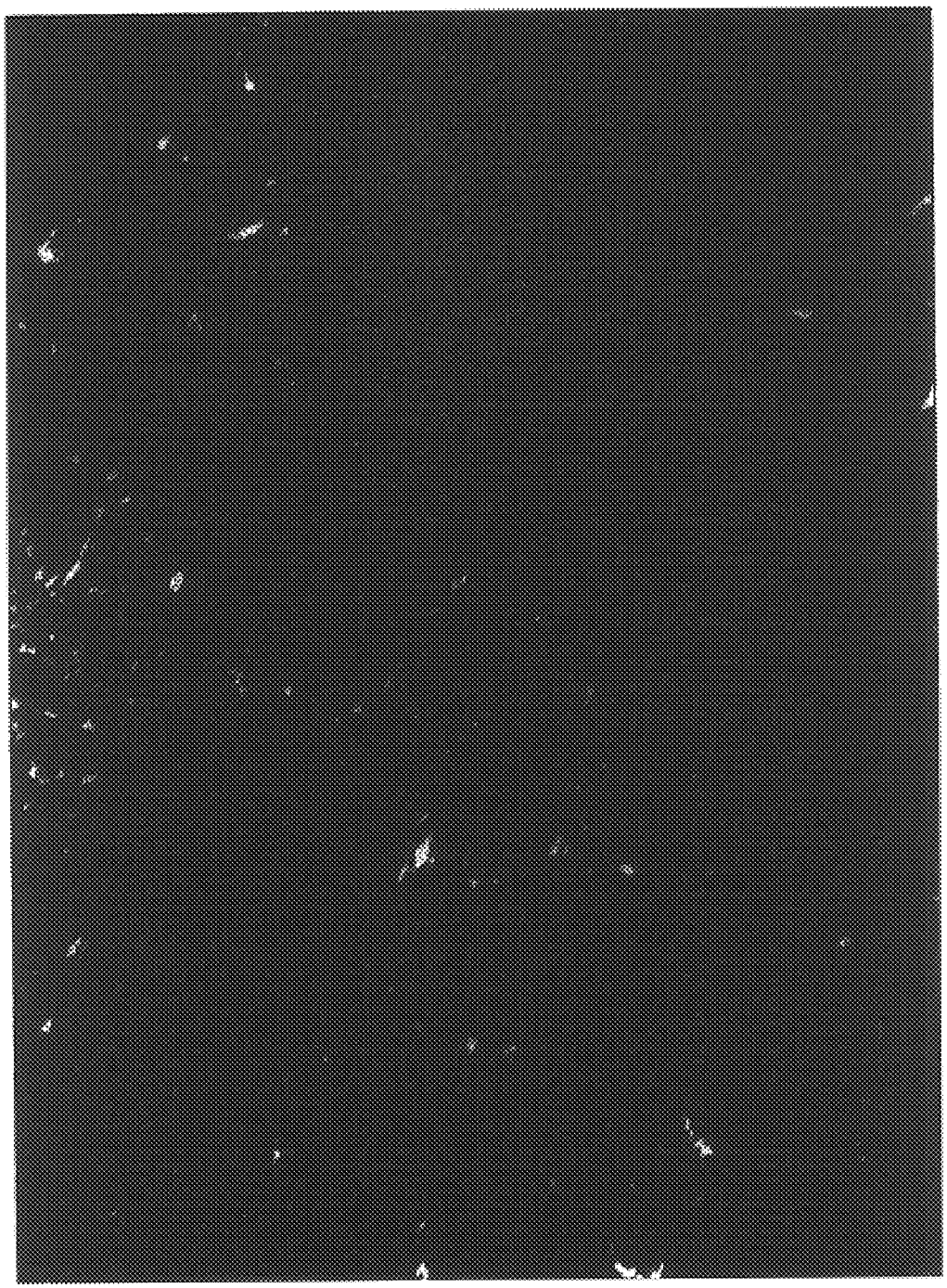
FIG. 6 shows a scanning electron micrograph of a calcined sample. A hexagonal arrangement of pores is recognizable here. Relatively large pores are also found, the occurrence of which is attributable to the shinking process during calcination.

FIG. 6 shows that the calcination produces additional pores with relatively large diameter in the region of about 100 nm. FIG. 7 shows that the resultant solids have high porosity with an internal surface area of, for example, about 300 cm³/g.

What is claimed is:

1. A process for preparing structured organic-inorganic hybrid materials, comprising the steps:
   (a) forming a mixture comprising at least one mesophase of an amphiphilic organic block copolymer consisting essentially of at least one hydrophilic block and at least one hydrophobic block as template and comprising at least one precursor which can be reacted to give an inorganic solid,
   (b) reacting the precursor in a bulk phase or in a mesophase that is free from solvent, and
   (c) optionally removing any volatile constituents from the reaction mixture, to produce the organic-inorganic hybrid material,
   wherein a hydrophobic block in the amphiphilic block copolymer has a glass transition temperature of $Tg \leq 50°$ C.

2. The process as claimed in claim 1, wherein a hydrophobic block in the amphiphilic block copolymer has a glass transition temperature $Tg \leq 25°$ C.

3. The process as claimed in claim 1, wherein a hydrophilic block in the amphiphilic block copolymer contains polyethylene oxide.

4. The process as claimed in claim 1, wherein the block copolymer has a molecular weight of from 1000 to 1,000,000 Da.

5. The process as claimed in claim 1, wherein the weight ratio of hydrophobic blocks to hydrophilic blocks in the amphiphilic block copolymer is from 95:5 to 5:95.

6. The process as claimed in claim 1, wherein the precursor contains Si, Al and/or Ti.

7. The process as claimed in claim 1, wherein a solvent which may be present is removed from the reaction mixture prior to the step of reacting the precursor.

8. The process as claimed in claim 1, wherein the hydrophobic block is selected from the group consisting of polyisoprene, polybutadiene, polydimethylsiloxane, methylphenylsiloxane, polyacrylate, polymethacrylate and/or hydrogenated polyisoprene or/and polybutadiene.

9. The process as claimed in claim 8, wherein the hydrophobic block contains polyisoprene.

10. The process as claimed in claim 1, wherein the weight ratio of block copolymer to precursor is from 5:95 to 95:5.

11. The process as claimed in claim 10, wherein the weight ratio of block copolymer to precursor is from 50:50 to 95:5.

12. The process as claimed in claim 1, wherein the organic-inorganic hybrid material is obtained as an anisotropic formed piece.

13. The process as claimed in claim 12, wherein the anisotropic formed piece is produced using a solvent-casting process.

14. The process as claimed in claim 1, wherein the mesophase of the amphiphilic block copolymer is formed using an organic solvent.

15. The process as claimed in claim 14, wherein the solvent is selected from the group consisting of chloroform, tetrahydrofuran and mixtures of these.

16. The process as claimed in claim 1, wherein the reaction mixture also comprises a salt.

17. The process as claimed in claim 16, wherein the salt is added to the block copolymer prior to forming the mesophase.

18. The process as claimed in claim 16, wherein the salt is added directly to the reaction mixture.

19. The process as claimed in claim 16, wherein the amount of salt added is from 0.01 to 5% by weight, based on the block copolymer used.

20. The process as claimed in claim 16, wherein the salt is selected from the group consisting of network modifiers.

21. The process as claimed in claim 20, wherein KCl is used.

22. The process as claimed in claim 1 and also comprising the step
(e) removing the template.

23. The process as claimed in claim 22, wherein step (e) includes calcination and/or extraction.

24. A formed piece consisting of organic-inorganic hybrid material or from inorganic material, obtainable by a process as claimed in claim 22, wherein the size of the formed piece is from 5 to 100 nanometers.

25. A formed piece as claimed in claim 24 in the form of a cylinder, sphere, cubic-type structure or lamella.

26. A mesoporous solid obtainable by a process as claimed in claim 22.

27. A solid as claimed in claim 26 with a pore diameter of from 5 to 100 nanometers.

28. Microelectronic components comprising a solid, wherein said solid comprises the composition claimed in claim 26.

29. A method of heterogenous catalysis in which the solid as claimed in claim 26 is an active ingredient.

30. An organic-inorganic hybrid material obtainable by a process as claimed in claim 1.

31. A hybrid material as claimed in claim 30, wherein the material has regular structures of from 5 to 100 nanometers in size.

32. A hybrid material as claimed in claim 31, wherein the material has structures of from 20 to 100 nanometers in size.

33. A hybrid material as claimed in claim 31, wherein the structures comprise nanocylinders, nanospheres, cubic-type nanostructures or nanolamellae.

34. A hybrid material as claimed in claim 30 in the form of an anisotropic formed piece.

35. A membrane material comprising the composition claimed in claim 30.

36. The membrane material of claim 35, wherein the membrane material is in the form of a film.

37. A process for preparing structured organic-inorganic hybrid materials, comprising the steps:
(a) preparing a sol comprising a precursor which can be reacted to give an inorganic solid,
(b) adding the sol from (a) to a mesophase of an amphiphilic organic block copolymer consisting essentially of at least one hydrophilic block and at least one hydrophobic block as template,
(c) reacting the precursor in a bulk phase or in a mesophase that is free from solvent to form a gel, and
(d) optionally removing any volatile constituents from the reaction mixture, to produce the organic-inorganic hybrid material.

38. The process as claimed in claim 37, wherein the hydrophobic fraction of the amphiphilic block copolymer has a glass transition temperature $Tg \leq 50°$ C.

39. The process as claimed in claim 37, wherein the sol is formed by at least partial hydrolysis of a precursor which can be reacted to give an inorganic solid.

40. A process for preparing structured organic-inorganic hybrid materials, comprising the steps:
(a) forming a mixture comprising a salt and at least one mesophase of an amphiphilic organic block copolymer consisting essentially of at least one hydrophilic block and at least one hydrophobic block as template and comprising at least one precursor which can be reacted to give an inorganic solid,
(b) reacting the precursor in a bulk phase or in a mesophase that is free from solvent, and
(c) optionally removing any volatile constituents form the reaction mixture, to prepare the organic-inorganic hybrid material.

* * * * *